United States Patent Office 3,356,891
Patented Dec. 5, 1967

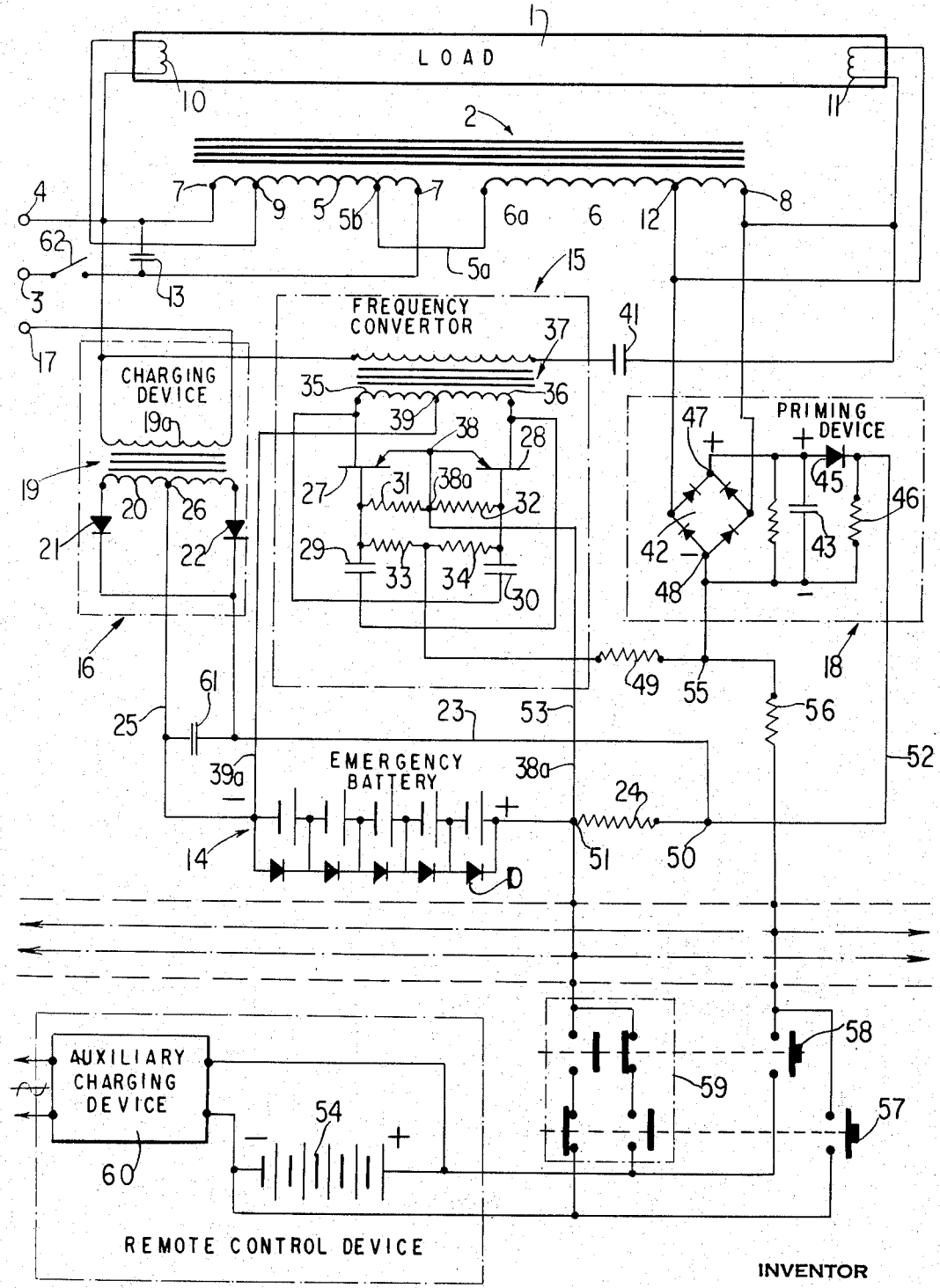

3,356,891
AUTOMATIC SUBSTITUTION OF A STANDBY POWER SOURCE RENDERED OPERATIVE ONLY WHEN THE LAMPS ARE CONNECTED
Pierre Godard, Livry-Gargan, France, assignor to Societe des Accumulateurs Fixes et de Traction (Societe Anonyme), Romainville-Saint-Denis, Seine, France, a French company
Filed May 24, 1966, Ser. No. 552,616
Claims priority, application France, June 2, 1965, 19,295
18 Claims. (Cl. 315—86)

ABSTRACT OF THE DISCLOSURE

Emergency power installation utilizing a standby storage battery intended to take over power supply to a load in the event of failure of the main power plant utilizing a high frequency converter connected between the emergency power source and a circuit of the flip-flop type which normally remains blocked by a polarization voltage at the terminals of a resistor through which a rectified current from the main power supply ordinarily passes, and including a priming device controlled by and sensitive to passage of current to the load to prevent operation of the frequency converter unless the load is in operation at the time when a power failure occurs, and not otherwise cause delivery of current from the standby battery until power is required by the load during main power failure.

---

This invention relates to an emergency power installation more especially one using a standby storage battery, provided to palliate the failure of a conventional power plant and its mains in feeding any appliance such as lighting apparatus, fluorescent lamps or such like.

Installations of this general kind have already been described and may broadly be classified in three groups defined as follows:

(1) Installations where in the case of a main plant circuit failure, the appliances which were being energized stop or go out and then are fed again, by means of a manual switch, through an emergency electrical circuit. The switching time must obviously be relatively long, for transfer from the mains to the emergency circuit, and on the other hand such an installation is not very convenient.

(2) Installations where a voltage controlled electromagnetic relay or such like connected to the mains operates automatically in case of failure of the main plant circuit, for switching the appliances into the emergency circuit. As the switching is automatically ensured in this manner, the emergency circuit will deliver current even if the appliances were not in operation at the time of failure, especially to step-up transformers usually placed between the standby storage battery and the appliances.

(3) Installations such as described notably in the French Patents Nos. 1,370,744 and 1,373,679 (no corresponding U.S. patents) under the respective titles "Process and Fitting-Up an Emergency Lighting Installation" and "Process for Fitting-Up an Emergency Lighting Circuit, and Circuit Fitted So" assigned to the same assignee as of this application and which are provided with a high frequency generator placed between the standby storage battery and the appliances, the said generator being directly connected to the terminals of the appliance and automatically operated in case of main plant circuit failure, whilst no high frequencies can be sent into the external mains because of the provision of suitable filtering means. Such installations provide many non-negligible advantages over those of installations of the first two-mentioned groups, among which advantages must be especially mentioned the speed in operation and the automaticity thus attained. Neverthless, the drawback of installations of this third group is that they deliver power to the circuit of the appliances, and especially to the frequency generator, in the case of main plant circuit failure, even when no appliance is actually in operation at the time of failure.

A principal object and feature of this invention is to provide an improved emergency power installation, overcoming the difficulties hereinabove mentioned, characterized by use of a high frequency converter of e.g., several thousand cycles per second, which is placed between the emergency power source, and a circuit of the flip-flop type which normally remains blocked due to a polarization voltage taken at the terminals of a resistor through which a rectified current from the main circuit ordinarily passes.

Thus, the converter cannot operate as long as the main circuit is normally supplied.

According to another object and feature of the invention, the above-mentioned high frequency oscillating circuit is energized by a priming device, delivering a polarization voltage which tends to prime or to maintain the oscillations of the converter, the said voltage being taken at suitable points of the appliance circuit and rectified e.g., by a rectifier bridge.

According to another object and feature of the invention, a condenser and various resistors are parallel-connected across the rectifying bridge terminals, the said condenser being capable of sending a priming pulse into the oscillating circuit of the converter in the case of main plant circuit failure, provided that the said circuit of the appliance was active at that moment of failure, i.e., that the said condenser was charged. It can be readily understood that, if the priming of the oscillating circuit of the converter is controlled by the polarization voltage derived from the circuit of the appliance and if this appliance is not active when the main circuit failure occurs, the oscillating circuit will not be primed and consequently the emergency installation will deliver no current either to the appliance or to the frequency converter. On the contrary, if the appliance was active when the main plant circuit failure occurred, the fact that a condenser and various resistors are parallel connected across the terminals of the rectifier bridge will cause this condenser to be charged and to remain so while the main plant circuit is operating; so that a priming pulse is delivered to the oscillating circuit of the converter by means of the previously charged condenser. The said oscillating circuit being then primed, the frequency converter will operate (because it is no longer blocked by the said polarization voltage derived from the resistor which is no longer energized after the occurrence of main circuit failure). Thus, the emergency installation starts to deliver current to the appliance which was previously fed by the main circuit. The appliance being supplied, the polarization voltage will continue to be applied to the oscillating circuit, thus maintaining the oscillations, so that this appliance will not be cut off.

According to this invention, it is, therefore, possible to design an emergency installation acting instead of a main plant circuit only if the appliances connected in the main plant circuit were active at the moment of plant failure. On the contrary, if the appliances were not active at this moment, the emergency circuit will not unduly deliver any current either to the frequency converter or, a fortiori, to the appliances.

According to another object and feature of this invention, an auxiliary device can be provided to give a polarization voltage to be used for priming or unpriming the said oscillating circuit in case of main plant circuit failure. In such conditions, the operation of the emergency installation circuit at any moment after the main plant circuit failure has occurred can either be stopped if the appliances were active, or be started if the appliances were not active.

Other objects and features of the invention will appear in the course of the following description and in the accompanying drawing, wherein the single figure, given only as an example, diagrammatically shows a typical emergency installation circuit embodying the invention.

According to this illustrative embodiment, an appliance comprising, for example, a fluorescent tube 1 and conventional ballast in the form, for example, of an electromagnetic leakage auto-transformer 2, is normally powered by the plant mains by usual connections across the main plant power terminals 3 and 4 thereof. The fluorescent tube 1 may be, for instance, of the instantaneous lighting type without starter. The two primary and secondary windings 5 and 6 of the ballast or auto-transformer 2 are series-connected as by wire 5a connected to intermediate tap 5b of the primary winding 5 and input end 6a of the secondary winding 6; in other words, the windings 5 and 6 being equal, the voltage between the input end point 7 leading to the first or primary winding 5 and the output end point 8 of the secondary winding 6 is substantially equal to twice the voltage at the terminals 3 and 4 of the plant mains. The input end 7 and intermediate tap 9 of the primary winding 5, which are close to each other, are connected to the heating filament 10 of tube 1, supplying a low voltage of about 6.3 volts, while the other heating filament 11 of said tube 1 is connected to similar neighboring tap 12 and output end 8 of the secondary winding 6 of the auto-transformer 2 and receives a similar voltage. This kind of circuit connection is conventional. A condenser 13 is parallel-connected across the ends 7 and 7a of the primary winding 5 of the auto-transformer 2, for the double purpose of improving the power factor from the plant and to act as a filter to avoid a transmission of high frequencies coming from the emergency installation to be described into the failing plant mains.

The actual emergency installation essentially comprises a storage battery 14, for instance, a battery of alkaline nickel-cadmium sealed cells or any other suitable direct current source, a frequency converter denoted generally by the reference character 15, serving for the conversion of the direct current delivered by the battery 14 into a variable high frequency current, for example, of about several thousand cycles per second (hertz). The emergency installation also comprises a charging device shown and denoted generally as a whole at 16 ensuring in normal conditions the charge and maintenance in a charged state of the emergency battery 14 across the two power terminals 4 and 17 of the mains. The priming device for the converter which was hereinabove alluded to, is denoted generally at 18.

For a better understanding of the invention, the various components comprising the respective devices 14, 15, 16, 18, listed above will now be described and then the conditions of operation will be explained for the various cases that might occur.

As seen in the drawing, the emergency battery 14 has a determined number of series-connected individual storage cells, each of the alkaline sealed type, for example. Protective diodes D shunting each cell may be provided, their function being to prevent the passage of a current flowing in the discharge direction when one or more of the cells are already nearly discharged. Such protective diode arrangement is shown, for example, in U.S. Patent 2,624,033 of Dec. 30, 1952.

The primary winding 19a of the transformer 19 of the charging device 16 is normally supplied (as long as the plant mains are operative) by connection across the terminals 4 and 17 of said mains. The said winding 19a may be used for charging the battery 14 through a rectifier assembly constituted by the secondary winding 20 of the said transformer 19 across whose outer terminals two rectifiers 21 and 22 are parallel-connected to the positive terminal of the battery 14 by a common lead 23 and a series-connected charging resistor 24, whereas the negative terminal of the said battery is connected to the middle point 26 of the transformer secondary winding 20 as by a lead 25.

The frequency converter 15 essentially comprises a flip-flop oscillating circuit constituted, for example, by two rectifier devices, e.g., two transistors 27 and 28 of PNP type, two condensers 29, 30, four resistors 31, 32, 33 and 34 and two series-connected primary half-windings 35 and 36 of a transformer 37. When the oscillating circuit of the converter 15 is suitably polarized, such as will be explained in detail hereafter, the windings 35, 36 of this frequency converting device 15 receive direct current from the emergency battery 14 via leads 38a and 39a and, therefore, deliver an alternating high frequency current to the secondary winding 40 of the said transformer 37. The positive terminal of the battery 14 is connected by lead 38a to the middle point 38, between the two series-connected emitters of the transistors 27 and 28 which are assembled in opposition, and the negative terminal of the battery is connected by the lead 39a to the middle point 39 between the two series-connected primary half-windings 35 and 36 of the said transformer 37. The secondary winding 40 of transformer 37 has one end connected to terminal 4 of the mains and its other end series-connected to a condenser 41 and from the latter to point 8 of auto-transformer 2 and these two parts constitute a filter passing only the high frequencies currents delivered by the secondary 40 of converter 15, but blocking low frequencies coming from the plant mains, for instance. The electrical characteristics and values of the coil 40 and of the condenser 41 obviously contribute to fix the value of the oscillation frequency provided by the converter 15.

The priming device 18 for the converter essentially comprises a diode rectifier bridge 42 parallel-connected to the terminals 8 and 12 of the winding 6 of auto-transformer 2 and to the filament 11. Connected across the output terminals 47 and 48 of rectifier bridge 42 are a condenser 43 and a resistor 44 for discharging the condenser 43 and, down-stream of a diode or a polarized rectifier 45 these output terminals are connected to a resistor 46 for unpriming the converter 18. The function of the said resistor 46 will be described hereafter.

When the plant supplying the terminals 3, 4 and 17 of the mains is active and the appliance or load 1 is operating, the terminal 47 of the bridge 42 in the priming device 18 has a positive potential as compared to the terminal 48 of the said bridge.

A priming resistor 49 for the frequency converter 15 is series-connected between the negative terminal 48 of the rectifier bridge 42 of said priming device 18 and the middle point of the resistors 33 and 34 of said convertor 15.

The operation of the installation as described hereinabove for various conditions can be deduced from the figure:

*Condition A.*—When the power plant is operating and provides a normal current supply at its terminal mains 3, 4 and 17 and when the tube 1 constituting the load appliance is lighted, current from the terminal mains 3 and 4 feeds the tube 1 through the ballast transformer 2 and also charges or maintains in a charged state the battery 14 via terminal mains 4 and 17 and the charging assembly 16 and the resistor 24. The value of this resistance 24 is so selected that the charging current passing through the battery has a suitable value, and is such that the potential difference between the outer points 50 and 51 of said resistor 24 is sufficiently high, being slightly exceeding 10 volts, for example.

Further, the priming device 18 for the converter 15 is then fed from between the points 8 and 12 of ballast transformer 2 and delivers a rectified voltage between the output points 47 and 48 of its current rectifier 42 of about a few volts being, however, lower than the voltage then existing between the points 50 and 51 of resistor 24. In other words:

$$V_{50}-V_{51}>V_{47}-V_{48}$$

Further, it may be seen that the points 47 and 50 are connected together via the rectifier 45 and lead 52. In these conditions, the potential $V_{48}$ of the point 48 is higher than the potential $V_{51}$ of the point 51. In other terms:

$$V_{48}>V_{51}$$

Since the point 51 is connected to the junction point 38 of the two transistor emitters in converter 15 via the lead 38a and the bases of the said transistors 27 and 28 are connected to the output point 48 of rectifier 42 in priming device 18 (through the resistors 49 and 33 or 34 in which no current then flows), therefore, the emitters of the said transistors 27 and 28 are then negatively polarized as compared to the bases of the said transistors. Thus, the transistors 27 and 28 are not then conductive and the oscillating circuit of the converter 15 is blocked, so that the transformer 37 receives no current.

*Condition B.*—When the power plant is operative and provides a normal current supply at its terminal mains 3, 4 and 17, and when the tube 1 is out of operation or cut off, i.e., when the ballast transformer 2 is not activated, the rectifier bridge 42 of the priming device 18 will receive no current from between the points 8 and 12 of said transformer 2. In these conditions, the transistors 27 and 28 are blocked due to the negative voltage $V_{51}$ applied to the point 38 of their emitters and also due to the more positive voltage of the point 50, supplied thereto via the lead 52, the unpriming resistor 46 and the lead connected thereto and point 55 and via the resistor 49 and to the resistors 33 and 34 in said converter 15. Thus, the said converter 15 is still cut off.

*Condition C.*—Assuming now that a failure occurs in the power plant so that there is no current supplied therefrom to the mains terminals 3, 4 and 17 at such a time that the appliance constituted by tube 1 and ballast transformer 2 are working, then the installation will react as follows:

The supply of current to the battery 14 from mains 4 and 17 is stopped so that there is no charging current supplied to the battery 14 via the charging device 16. Thus, the positive potential difference $V_{50}-V_{51}$ becomes nearly null. The middle point between the resistances 33 and 34 of the converter 15 is thus brought to a negative potential as compared to that of the point 38 between emitters of transistors 27 and 28 (owing to the discharge action of the condenser 43 in priming device 18 discharging through the diode 45, the resistor 24, the resistors 33 and 34, the resistors 31 and 32, the point 38b between said resistors 31 and 32 and the resistor 49). The transistors 27 and 28 then become conductive and prime the oscillating circuit at the terminals 38 and 39 of which the negative and positive terminals of the battery 14 are connected, thus delivering the battery current to the primary coils 35, 36 as an alternating current due to oscillation action in the converter 15. Thus, the secondary winding 40 of the transformer 37 is supplied with an alternating current of high frequency which replaces the current normally supplied by the plant mains for operating the tube 1 and ballast transformer 2. Specifically, then the rectifier bridge 42 of the primary device 18 is again fed at the terminals 8 and 12 which are connected across the filament 11 and, therefore, the condenser 43 is entirely recharged and remains charged, thus maintaining a suitable polarization voltage between the emitters and the bases of the still-operating transistors 27 and 28. Thus, the operation of tube 1 and ballast transformer 2 are maintained.

*Condition D.*—If, on the contrary, the power plant failure occurs and current supply to its mains 3, 4 and 17 is cut off at a time when tube 1 and ballast are not active, in such event, the condenser 43 is discharged (through the resistor 44). In such conditions, the transistors 27 and 28 of the converter 15 remain blocked because the condenser 43 cannot be charged by the battery 14 owing to the polarized diode 45 and, as a consequence, a suitable polarization of the transistors 27 and 28 cannot be attained. Thus, the converter 15 cannot operate and the tube 1 with ballast transformer 2 will receive no current.

*Condition E.*—In order to control the lighting or extinction of the appliance or load constituted as by a tube 1 and a ballast transformer 2 in the case of power plant failure, occurs with cut-off of currents to its mains 3, 4 and 17 and while battery 14 is in condition to supply its power to said tube 1 and ballast transformer 2, a remote control device can be provided. This remote control device essentially comprises a primary or secondary remote control battery 54 of small capacity. The positive and negative terminals of this battery 54 may be connected respectively by a pair of gang switches 57 and 58 at will to the points 51 or 48 (or 55 which is connected to 48) which control, as has been seen above, the polarization voltage of the emitters and bases of the transistors 27 and 28, the transistors being conductive if $V_{48}-V_{51}<0$, and non-conductive if $V_{48}-V_{51}>0$. Moreover, the intensity of the controlling current is preferably limited by a resistor 56 provided in the circuit of the remote control device.

From the figure, it may be seen that, by pushing the control button of gang switch 57, the negative terminal of the remote control battery 54 is connected to the point 48, and its positive terminal to the point 51. Therefore, the transistors 27 and 28 then become conductive and the oscillating circuit in converter 15 is thus primed. On the contrary, by pressing the button of gang switch 58, the positive terminal of the remote control battery 54 is connected to the point 48, and its negative terminal to point 51 thus imposing on the transistors 27 and 28 a reversed polarization voltage which blocks the oscillating circuit of converter 15.

In these circumstances, when a current supply from the plant to its mains 3, 4 and 17 happens to fail, while the tube 1 and ballast transformer 2 are not operating, the battery 14 delivers no current because the converter 15 remains blocked. If the failure continues for too long, and if it is desired that the appliance (tube 1 and ballast transformer 2) be made operative through current from the battery 14, the simple pushing of the control button of gang switch 57 will give the proper polarization voltage from battery 54 required to render the transistors 27 and 28 conductive and prime the oscillating circuit of the converter 15. The button of gang switch 57 can then be released and the emergency battery 14 will then supply the necessary operating current, as has been described above.

On the contrary, if plant failure and current supply to its mains fails while the appliance (tube 1 and ballast transformer 2) are operating, these will be kept in operation by the emergency battery 14 supplying current to the converter 15 which is primed by the primary device 18 and which will maintain the suitable polarization voltages for the transistors 27 and 28. If the failure continues for too long, the emergency power supply from battery 14 can easily be stopped by pushing the control button of gang switch 58 which will thus impose a reverse polarization voltage from the remote control battery 54 to the emitters and bases of the transistors 27 and 28, thus blocking the oscillating circuit and cutting off current supply to the tube 1 and transformer 2. The condenser 43 will then discharge and even if the button 58 is released, the oscillating circuit will remain blocked and the appliance will remain inoperative.

Advantageously, as shown at 59, an electrical locking device is provided by various contacts and blades of the gang switches 57 and 58 which prevents the short-circuiting of battery 54, such as could be caused by an erroneous simultaneous pushing of both control buttons 57 and 58.

Moreover, as shown at 60, a suitable auxiliary charging device can be provided to charge the auxiliary remote control battery 54.

In the same manner, a condenser is shown at 61 connected across leads 23 and 25 for filtering the charging current of the battery 14 and preventing the rectified current from charging device 16 from being null, i.e., lessening the residual wave at the terminals of the resistor 24. A manual switch 62 is shown in main 3 and is provided for controlling current supply to the tube 1 and ballast transformer 2 without cutting off the charging current of the battery 14 while the power plant is operative.

As an example of the characteristics of the various components in the embodiment connected in accordance with the drawing, they might be as follows:

In the table shown below, the subscript reference numerals are the same as in the figure, the letters associated therewith being respectively R for resistors, C for condensers, D for rectifiers and T for transistors.

*List of components*

| | |
|---|---|
| R24—Resistor 24 for charging the battery 14 and unpriming the converter 15 ohms | 33 |
| R49—Resistor 49 for priming the converter 15 ohms | 47 |
| R56—Resistor 56 for the remote control device ohms | 68 |
| R46—Resistor 46 in priming device 18 for unpriming the converter 15 ohms | 330 |
| R44—Resistor 44 for discharging the condenser 43 in priming device 18 ohms | 1000 |
| R31–R32, R33–R34—Resistors 31, 32, 33 and 34 of transistor bases in converter 15, each ohms | 120 |
| C41—Condenser 41 in series for ballast transformer 2 supply—22 nF.= μF | 0.022 |
| C61—Condenser 61 for filtering the charging current to battery 14 μF | 200 |
| C43—Condenser 43 of the priming device 18 for tube lighting memory purposes μF | 100 |
| C29–C30—Condensers 29 and 30 of transistor bases in converter 15, each μF | 1 |
| C13—Condenser 13 for filtering high frequency in the mains 3 and 4 μF | 4 |

D21–D22—Rectifiers 21 and 22 in charging device 16 of the battery 14, type 1W E1.
D45—Polarized diode 45 in primary device 18, type 1W E1.
D—Diodes D in parallel with cells of battery 14 for cell protection, type BYY20 and BYY21 T27–T28—Converter transistors 27 and 28 for converter 15, PNP type ASZ 16.

With these components, connected as described, the frequency converter 15 is about 3750 c.p.s. (hertz).

Many changes can be effected in the described embodiment. Specifically, for example, the transistors 27 and 28 may be of the NPN instead of the PNP type, provided that the polarization voltages controlling the emitters and the bases of such transistors are reversed in the various conditions described. In the same way, the oscillating circuit of the converter 15 may use diodes with suitable control electrodes instead of transistors.

Thus, while specific embodiments of the invention have been described and shown, variations in practice within the scope of the appended claims are possible and are contemplated. There is no intention, therefore, of limitation to the exact disclosure herein presented.

What is claimed is:

1. An emergency installation for use in conjunction with the mains of a power plant to supply power to an appliance in the event of power failure of the plant comprising a storage battery source of emergency power, a charging circuit for said source connected to said mains, a high frequency converter connected to said source of emergency power for supplying high frequency current therefrom to said appliance only in the event of power failure, an automatic priming device interconnected with said converter and said appliance and operative automatically on the occurrence of power failure only if the appliance at that time is in operative condition to then trigger said converter to high frequency current supplying condition to the appliance on said occurrence of power failure to maintain the operative condition of said appliance from said battery source of emergency power, said priming device including means for automatically preventing the triggering of said converter to current supplying condition at the time of power failure if the appliance then is not in operative condition.

2. An emergency installation according to claim 1, including independent means connected to said priming device and operative at will subsequent to power failure to condition the priming device so as to render the converter operative and inoperative as desired and thus likewise operate and cut-off the appliance subsequent to power failure.

3. An emergency installation according to claim 1, wherein said converter includes a flip-flop oscillating circuit that is normally blocked by a reverse polarization voltage across a resistor and derived as a result of flow of charging current therethrough to the battery source while the power plant is operative.

4. An emergency installation according to claim 3, wherein said flip-flop oscillating circuit includes flip-flop connected transistors and associated condensers and resistors.

5. An emergency installation according to claim 1, including a high pass filter connected between the converter and the appliance to preclude passage thereto of low frequencies coming from the mains while the plant is operative.

6. An emergency installation according to claim 5, wherein said high pass filter includes a condenser and said converter has an output transformer to whose secondary winding said condenser is connected in series.

7. An emergency installation for use in conjunction with the mains of a power plant to supply power to an appliance in the event of power failure of the plant comprising a storage battery source of emergency power, a charging circuit for said source connected to said mains, a high frequency converter connected to said source of emergency power for supplying high frequency therefrom to said appliance only in the event of power failure, a priming device interconnected with said converter to high frequency supplying condition to the appliance only in the event that the latter is in operative condition at the time of power failure to maintain the operative condition of said appliance from said battery source of emergency power, said converter including a flip-flop oscillating circuit that is normally blocked by a reverse polarizing voltage, said priming device serving to activate said converter oscillating circuit by a second polarizing voltage, and said appliance including a circuit having taps, and a rectifier in said priming device connected to said taps to provide said last-named polarizing voltage.

8. An emergency installation according to claim 7, in which said last-named polarizing voltage has an absolute value lower than that of said reverse polarization voltage.

9. An emergency installation according to claim 7, wherein said rectifier in said priming device is a rectifier bridge, a condenser and resistors parallel-connected to output terminals of said bridge, and said condenser being connected to send a priming pulse to said oscillating circuit of said converter on occurrence of power failure provided that said appliance circuit is active at such time and said condenser is in a charged state and thus cause said converter to deliver high frequency current from the emergency battery source to said appliance.

10. An emergency installation according to claim 9, including an additional rectifier connected to an output terminal of said bridge and to said emergency battery source which prevents charging of said condenser by said emergency battery source.

11. An emergency installation according to claim 7, including a resistor connected to said charging circuit and to said emergency battery source through which charging current flows from the mains, a condenser in said priming device whose positive terminal is connected to the input terminal of said resistor, resistors connected to the negative terminal of said condenser, said converter including a flip-flop oscillating circuit comprised of transistors having bases and emitters, said last-named resistors being connected to said bases and the output terminal of said first-named resistor being connected to said emitters.

12. An emergency installation according to claim 7, wherein charging circuit for said emergency battery includes a rectifying circuit connected to said means of the power plant, and a resistor series-connected with said charging circuit and energized by power from the mains through said rectifier circuit.

13. An emergency installation according to claim 12 wherein said charging circuit comprises a transformer having primary and secondary windings, the primary winding being connected to said mains, said secondary winding having a mid-point tap and end taps, said mid-point tap being connected to a terminal of said battery, parallel-connected rectifiers connected to said end taps and series-connected through a resistor to the terminal of said battery, a condenser series-connected between said mid-point tap and to the input of said last-named resistor.

14. An emergency installation according to claim 13 wherein said last-named resistor and the resistor of claim 12 are the same.

15. An emergency installation according to claim 7, wherein said appliance is operable by the mains of said plant and by said emergency battery and comprises a fluorescent tube with starting filaments, a ballast auto-transformer having two series connected windings respectively tapped to provide low voltage and connected to said filaments to energize them.

16. An emergency installation according to claim 15 including a condenser parallel-connected with one winding of said ballast transformer to filter high frequency currents generated by said emergency battery from the mains when plant failure occurs.

17. An emergency installation according to claim 7, wherein said appliance comprises a fluorescent tube with starting filaments and a ballast auto-transformer having series-connected primary and secondary windings respectively provided with taps to furnish low voltages across them which are connected to said filaments, said priming device being connected to the said low voltage taps on the said secondary winding of said auto-transformer.

18. An emergency installation according to claim 7, wherein said appliance comprises a fluorescent tube with starting filaments and a ballast auto-transformer having primary and secondary windings, the primary winding having its input and output ends connected to the mains and intermediate taps near its input and output ends, and said secondary winding having end taps and an intermediate tap near its output end, the input tap of said secondary winding being series-connected to the intermediate tap adjacent the output tap of the primary winding to provide a voltage in opposition to the input end of said secondary winding, and said filaments respectively being connected to the input end of the primary winding and its next adjacent intermediate tap and to the output end of said secondary winding and its next adjacent tap.

References Cited

UNITED STATES PATENTS

| | | | |
|---|---|---|---|
| 2,808,540 | 10/1957 | Moerkens | 315—100 |
| 3,029,362 | 4/1962 | Roberts | 315—86 |
| 3,201,592 | 8/1965 | Reinhart et al. | 315—86 X |
| 3,255,358 | 6/1966 | Kilpatrick | 307—66 X |

JAMES W. LAWRENCE, *Primary Examiner.*

C. R. CAMPBELL, *Assistant Examiner.*